United States Patent [19]

Baumann

[11] Patent Number: 4,729,544
[45] Date of Patent: Mar. 8, 1988

[54] ELECTRIC-POWERED, LEVER-AMPLIFIED ACTUATING MEANS FOR VALVES AND OTHER DEVICES

[76] Inventor: Hans D. Baumann, 32 Pine St., Rye, N.H. 03870

[21] Appl. No.: 46,794

[22] Filed: May 7, 1987

[51] Int. Cl.⁴ .................... F16K 31/04; F16K 7/16
[52] U.S. Cl. .................... 251/129.05; 251/129.11; 251/229; 251/263; 251/331; 74/110; 74/89.15
[58] Field of Search .............. 251/129.11, 129.2, 58, 251/229, 251, 129.05, 263, 331; 269/228, 27; 74/110, 89.15

[56] References Cited

U.S. PATENT DOCUMENTS 3,941,362  3/1976  Arnold et al. .................. 269/228 X
4,455,012  6/1984  Gupta .......................... 251/129.05
4,549,719  10/1985  Baumann ....................... 251/280

Primary Examiner—Arnold Rosenthal

[57] ABSTRACT

Electric-powered, lever-amplified actuating means for valves and other devices which may be used to replace heretofore employed hydraulic jacks capable of transforming a small force traveling a great distance into a large force being motivated over a small distance, and where such amplifying ratios exceed 5 to 1; the mechanical amplifying means consisting of two upper ball bearings displaced radially down by a piston or diaphragm plate which in turn causes a cosinusoidal, small distance displacement of a lower pair of ball bearings; an electric motor turning a threaded spindle cooperating with a nut is made to move the piston or diaphragm plate.

4 Claims, 1 Drawing Figure

ELECTRIC-POWERED, LEVER-AMPLIFIED ACTUATING MEANS FOR VALVES AND OTHER DEVICES

BACKGROUND OF THE INVENTION

This invention relates to and offers certain improvements over my invention covered under U.S. patent application Ser. No. 900,323 filed on 8/25/86 and now granted.

The invention relates to mechanical amplifying means which may be used in place of previously employed hydraulic jacks and other hydraulic devices which are well-known to the experts in the field and which are capable of performing this task extremely well and with very high efficiencies; that is, very little of the translated work is lost by way of friction. Hydraulic devices fitting the above description are commonly used on tool machinery to position tools, to lift heavy loads such as machinery for construction equipment and to close valve plugs against very high pressure differentials of liquid or gaseous media (see my U.S. Pat. No. 4,320,778).

However, one of the disadvantages of such hydraulic means to alter the force/distance relationship is that hydraulic devices are very susceptible to leakage and rams or piston rods have to be very precisely machined to avoid leakage between sliding stem seals especially when one considers the very high (usually on the order of 1,000-3,000 psi) hydraulic fluid pressures involved. Another disadvantage of hydraulic means is the very high coefficient of cubic thermal expansion which is especially troublesome when a valve to be closed handles a hot fluid, or when the precision-positioned machine tool becomes warm while performing work. Such undesirable thermal expansion can lead to rather large positioning errors.

Certain mechanical amplifying means for actuators known to the state of the art are shown in U.S. Pat. Nos. 2,443,775; 2,395,223; 4,265,141; 4,270,398 and 3,941,362. All these known devices exhibit neither the simplicity nor the high amplifying ratio which can be achieved with my invention. For example, U.S. Pat. No. 3,941,362 uses a right triangle type toggle mechanism which amplifies only 4:1 (see column 2, line 25 of his specifications). Furthermore, there is no adjustment of his mechanism which in turn is very complex, requiring a cam profile and a two stage amplification. Neither of these reference patents show electrical actuation means.

My invention overcomes these disadvantages by:
a. eliminating the requirement for a hydraulic fluid, not requiring fine surface finishes, sliding stem seals and the potential of a hydraulic leak; and
b. by utilizing all metal parts in its construction, it is capable of operating over wide temperature ranges without experiencing significant positioning errors due to thermal expansion problems.

In addition, my mechanical apparatus is very easy to handle, has a very high efficiency (similar to that of hydraulic systems) and can be produced very economically and without great need for precision.

As a result of the above cited advantages, such mechanical amplifying means are now capable of replacing hydraulic amplifying and positioning means on valves such as the one shown in my U.S. Pat. No. 4,278,234, for example. Additionally, amplifying ratios of more than 15:1 are possible.

Instead of using air as operating or displacement medium, this invention utilizes the power of a conventional electrical motor which in turn causes the initial displacement prompted by, for example, a computer signal.

More advantages of my invention will become apparent when viewed in light of the following description.

DESCRIPTION OF THE INVENTION

Figure 1:
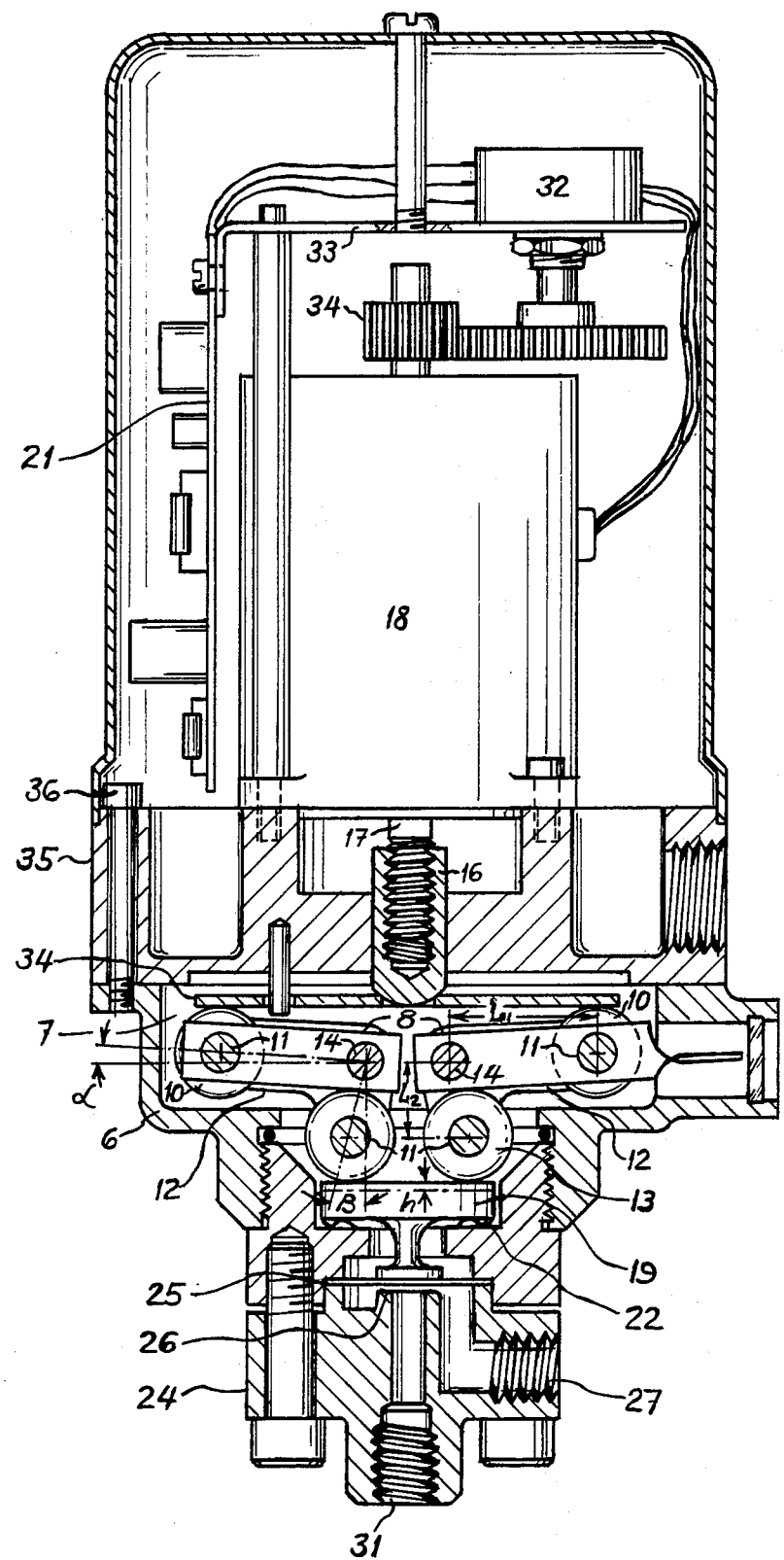
FIG. 1 is a vertical, central, cross sectional view showing a preferred structure and arrangement of parts of my invention employed in conjunction with valving means.

The subject invention comprises a housing (6) having a central opening (7) to receive a pair of toggle means (8) mounted between wall portions of housing (6). Each toggle means (8) is comprised of one or more upper ball bearinsg (10) mounted on a shaft (11) between a pair of plates (12) plus one or more lower ball bearings (13) equally as well supported by shafts (11) between said plates (12). In a preferred configuration, both upper and lower bearings are spaced equal distance from a diaphragm plate (34) capable of pushing the upper ball bearings (10) down to cause a free-tilting motion of said toggle means (8) around the axis of bore (14). Diaphragm plate (34) is supportive of a nut (16) which in turn is motivated in a vertical direction by a threaded shaft (17) of an electric motor (18). A pulsed electrical signal from an attached amplifier (21) is administered to motor (18), causing shaft (17) to rotate and thereby lift nut (16) and plate (34); this in turn causes a tangential displacement and a tilting motion of the toggle element (8) over the axis of bore (14), which in turn, causes an increase in angle $\beta$ which then reduces the distance $L_2$ by the difference between the cosine of the former angle $\beta$ multiplied by the distance between the center of bore (14) and the center of bearing (13) and the cosine of the larger angle $\beta$ multiplied by the same center distance. Such a shortening of the cosinusoidal distance $L_2$ now forces an upward motion "h" of a displacement piston (19) pushed by a wave spring (22).

The overall amplifying ratio of this mechanical arrangement is the ratio between vertical motion of plate (34) divided by the vertical motion of displacement piston (19). A typical amplifying ratio of 16 to 1 can be achieved by using a $\beta$ angle of 10° and then decreasing the $\beta$ angle to 5°.

Such a change in angle $\beta$ by 5° also causes an identical change in angle $\alpha$. However, the displacement "H" is a function of sinus $\alpha$ multiplied by $L_1$ while distance "h" is a function of cosine $\beta$ multiplied by $L_2$. Since cos 10° − cos 5°=0.011 and sinus 5°=0.087, a natural advantage of 8:1 is achieved, which can further be enlarged to 16:1 by doubling the distance $L_1$ over $L_2$.

When connected to a valve (24), displacement piston (19) can be used to force a metal diaphragm (25) against a valve orifice (26) causing the disruption of fluid flow between ports (31) and 27).

A suitable electronic signal entering amplifier (21) can now be used to cause diaphragm (25) to lift off orifice (26) and cause fluid to flow.

Since my invented amplifying means can create substantial forces, such as 1,000 lb. force exerted upon diaphragm (25) with only 65 lb. force input by plate (34) caused by the exerted torque of motor (18), the same diaphragm (25) can be subjected to very high fluid pressures and still allow tight shutoff of valve port (26). Furthermore, since all static forces acting on bearings and shafts are unidirectional, there is no loose play that may effect the position of the translated motion leading to an extremely accurate positioning of displacement piston (19). It should also be noted that with the use of ball bearings there is very little friction involved and the angle $\beta$, for example, can be reduced to less then 5° without leading to self-locking of the mechanical parts.

In order to utilize my invention for automatic throttling purposes, a feed-back potentiometer (32) can be attached to a support structure (33) to sense, by means of suitable gearing (34), the position of motor shaft (17) and therefore the position of piston (19). The voltage signal produced by potentiometer (32) is then compared to a similar voltage produced by said computer signal to the amplifier (21). If both voltages match, then the amplifier stops sending power impulses to the motor (18) (typically a DC stepping motor). A suitable cover means (35) is bolted (36) to the housing (6) and is machined to hold the motor (18) and to guide the nut (16).

Having thus shown and described the invention, what is claimed as new and desired to be secured by Letters Patent is described in the following claims:

1. Electric-powered, lever-amplified actuating means for valves and other devices comprising:
   a. one pair of toggle elements mounted in spaced relationship within a housing having a central opening, each of said toggle elements pivotably supported by shaft means which are suitably retained within said housing;
   b. each of said toggle elements comprising at least one upper bearing suitably supported essentially level to said shaft means, and at least one lower bearing suitably rotatably supported below said shaft means;
   c. displacement means mounted within the lower portion of said central opening of said housing and being engaged to said lower bearings;
   d. plate means mounted within the upper portion of the housing opening having a flat lower surface being subjected to rolling motion of the upper bearings and capable of engaging and displacing said upper bearings down and thereby pivoting said pair of toggle elements around said shaft means, said pivoting motion further causing said lower bearings to extend their cosinusoidal distance with respect to the supporting shaft means and thereby causing a downward motion of said displacement means;
   e. electric motor means suitably mounted above said housing having threaded shaft means capable of causing a displacement of said plate means following a rotation of said shaft.

2. Electric-powered, lever-amplified actuating means for valves and other devices as described in claim 1, having cover means to close up the upper portion of the central opening of said housing and wherein said cover means supports said electric motor means.

3. Electric-powered, lever-amplified actuating means for valves and other devices as described in claim 1, where said displacement means is cooperating with closure means capable of opening and closing a valve orifice.

4. Electric-powered, lever-amplified actuating means for valves and other devices as described in claim 1, having additional amplifier and feed-back potentiometer means capable of sensing and controlling the rotary position of said threaded motor shaft means.

* * * * *